(12) United States Patent
Amann et al.

(10) Patent No.: US 7,686,554 B2
(45) Date of Patent: Mar. 30, 2010

(54) COMBINATION OF A SCREW MEMBER, A WASHER AND A SLEEVE AND ALSO A METHOD OF PRODUCING SUCH A COMBINATION

(75) Inventors: Erich Amann, Rottenburg (DE); Peter Böhringer, Hülben (DE)

(73) Assignee: Elringklinger AG, Dettingen (DE)

( * ) Notice: Subject to any disclaimer, the term of this patent is extended or adjusted under 35 U.S.C. 154(b) by 0 days.

(21) Appl. No.: 11/973,512

(22) Filed: Oct. 9, 2007

(65) Prior Publication Data
US 2008/0118329 A1      May 22, 2008

Related U.S. Application Data

(63) Continuation of application No. PCT/EP2006/010070, filed on Oct. 19, 2006.

(51) Int. Cl.
*F16B 21/18* (2006.01)
(52) U.S. Cl. ............... 411/352; 411/369; 411/371.1; 411/533; 411/542
(58) Field of Classification Search ........... 411/107, 411/352, 353, 369, 371.1, 533, 542, 999
See application file for complete search history.

(56) References Cited

U.S. PATENT DOCUMENTS

| | | | | |
|---|---|---|---|---|
| 1,412,970 A | * | 4/1922 | Salfisberg | 24/356 |
| 1,788,735 A | * | 1/1931 | Olson | 470/42 |
| 1,818,651 A | * | 8/1931 | Ross | 411/542 |
| 2,492,115 A | * | 12/1949 | Crowther | 411/353 |
| 3,099,456 A | * | 7/1963 | Hopp | 277/598 |
| 3,221,794 A | * | 12/1965 | Acres | 411/353 |
| 3,247,752 A | * | 4/1966 | Greenleaf et al. | 411/542 |
| 3,405,591 A | | 10/1968 | Neuschotz | |
| 3,871,429 A | * | 3/1975 | Bosse | 411/107 |
| 4,387,497 A | * | 6/1983 | Gulistan | 29/511 |
| 4,435,112 A | | 3/1984 | Becker | 411/368 |
| 4,447,183 A | * | 5/1984 | Yunt | 411/80.5 |
| 4,616,967 A | * | 10/1986 | Molina | 411/105 |
| 4,802,802 A | * | 2/1989 | Thurner | 411/107 |
| 4,883,395 A | * | 11/1989 | Klaric | 411/55 |
| 5,328,311 A | * | 7/1994 | Knohl | 411/353 |
| 5,577,854 A | | 11/1996 | Jacob et al. | 403/2 |

(Continued)

FOREIGN PATENT DOCUMENTS

EP      0 967 401 A2      12/1999

*Primary Examiner*—Victor Batson
*Assistant Examiner*—Roberta DeLisle

(57) ABSTRACT

In order to produce a combination of a screw member comprising a screw head, a threaded portion and a shank portion which is arranged between the screw head and the threaded portion and has an external diameter that is smaller than the external diameter of the threaded portion, a washer incorporating a passage opening the diameter of which is smaller than the external diameter of the threaded portion, and a sleeve the internal diameter of which is greater than the external diameter of the threaded portion, whereby said combination can be produced in a simple manner but nevertheless ensures that the sleeve and the washer are held securely on the screw member, it is proposed that the sleeve have at least one projection which engages in a recess provided in the washer, wherein the sleeve is pressed against the washer in such a manner that the sleeve and the washer are connected together and held captive on the screw member.

12 Claims, 6 Drawing Sheets

U.S. PATENT DOCUMENTS 5,662,444 A * 9/1997 Schmidt, Jr. ................ 411/369
6,582,171 B2 * 6/2003 Bondarowicz et al. ...... 411/353
6,623,226 B2 * 9/2003 Braun et al. ................ 411/353
6,705,813 B2 * 3/2004 Schwab ...................... 411/526
6,884,014 B2 * 4/2005 Stone et al. ................. 411/352
2005/0095085 A1 * 5/2005 Winker ....................... 411/533

* cited by examiner

US 7,686,554 B2

COMBINATION OF A SCREW MEMBER, A WASHER AND A SLEEVE AND ALSO A METHOD OF PRODUCING SUCH A COMBINATION

This application is a continuation of International application No. PCT/EP2006/010070 filed on Oct. 19, 2006.

RELATED APPLICATION

The present disclosure relates to the subject-matter which was disclosed in the international patent application No. PCT/EP2006/010070 dated Oct. 19, 2006. The entire description of this earlier application is incorporated by reference thereto as a constituent part of the present description ("incorporation by reference").

FIELD OF DISCLOSURE

The present invention relates to a combination of a screw member comprising a screw head, a threaded portion and a shank portion which is arranged between the screw head and the threaded portion and has an external diameter that is smaller than the external diameter of the threaded portion, a washer incorporating a passage opening the diameter of which is smaller than the external diameter of the threaded portion, and a sleeve the internal diameter of which is greater than the external diameter of the threaded portion.

BACKGROUND

Such a combination is known from DE 199 24 502 C2. In this known combination, the sleeve is fixed to the washer by an adhered, welded or soldered joint. The washer and/or the sleeve are slit so that the sleeve and/or the washer expand when slipping the narrow section formed by the washer over the threaded portion of the screw member and then snap back again after the narrow section has been pushed completely over the threaded portion. The washer and the sleeve are held captive on the screw member once they have snapped back.

A further combination of a screw member and a washer together with a sleeve which are held captive on the screw member is known from DE 195 10 349 A1. In this combination, the washer comprises a deep-drawn opening having a collar which is surrounded by the sleeve in clamping manner. For the purposes of clamping the collar of the washer, the inside of the sleeve must be provided with a chamfer at the screw head end thereof. The retention of the sleeve on the washer, which is only being accomplished by the clamping effect of the collar projecting into the sleeve, is not particularly secure.

SUMMARY OF THE INVENTION

The object of the present invention is to provide a combination of the type mentioned hereinabove which is producible in a simple manner but which nevertheless ensures that the sleeve and the washer are held securely on the screw member.

In accordance with the invention, this object is achieved in the case of a combination comprising the features indicated in the preamble of claim 1 in that the sleeve has at least one projection which engages in a recess provided in the washer, wherein the sleeve is pressed against the washer in such a manner that the sleeve and the washer are connected together and held captive on the screw member.

Thus, the concept underlying the present invention is that of interlocking the sleeve and the washer by means of the projection on the sleeve and the recess in the washer and also pressing the sleeve and the washer together in a manner such that the sleeve is securely fixed to the washer and thus both the sleeve and the washer are held securely captive on the screw member.

Hereby, the process of pressing the sleeve and the washer together is preferably only effected when the screw member has been inserted into the sleeve and a washer pre-form so that it is not necessary to use a slit sleeve and/or a slit washer but rather, a slit-free sleeve and a slit-free washer can be utilised.

In a preferred embodiment of the invention, provision is made for the sleeve to have at least two projections which engage in a respective recess provided in the washer.

The hold between the sleeve and the washer pressed thereagainst is thereby improved.

A further improvement in the hold between the washer and the sleeve is achieved if the sleeve has at least three projections which engage in a respective recess provided in the washer.

Hereby, the projections preferably succeed one another with substantially equal spacings around the periphery of the sleeve.

The at least one projection of the sleeve is preferably aligned substantially parallel to the longitudinal axis of the sleeve.

In order to enable the washer to rest on the screw head of the screw member, it is of advantage if the at least one projection is arranged at a screw head end of the sleeve.

In a preferred embodiment of the invention, provision is made for the regions of the washer bounding the at least one recess which may, in particular, be in the form of webs, to be oriented substantially perpendicularly to the longitudinal axis of the sleeve when in the state where it is pressed against the sleeve. The effect is thereby achieved that the washer is substantially flat in the state where it is pressed against the sleeve.

The at least one recess in the washer preferably opens into the passage opening in the washer.

The passage opening in the washer is preferably arranged substantially centrally of the washer.

In one preferred embodiment of the invention, the washer is formed from a washer pre-form, wherein the regions of the washer bounding the at least one recess in the washer which may, in particular, be in the form of webs, are oriented at an angle with respect to the central axis of the washer.

In particular hereby, provision may be made for the regions of the washer pre-form bounding the at least one recess in the washer to define a passage opening in the pre-form the diameter of which is greater than the diameter of the passage opening in the washer when in the state where it is pressed against the sleeve.

Preferably, provision is made for the diameter of the passage opening in the pre-form to be so large that the threaded portion of the screw member is movable through the passage opening in the pre-form. It is thereby possible to join the washer pre-form and the sleeve together in such a way that the at least one projection of the sleeve engages in the at least one recess in the washer pre-form, to then move the threaded portion of the screw member through the passage opening in the pre-form and then to press the sleeve against the washer pre-form in such a way that the sleeve and the washer formed from the washer pre-form by the pressing process are connected together and held captive on the screw member.

Furthermore, the present invention relates to a method of making a combination of a screw member comprising a screw head, a threaded portion and a shank portion which is arranged between the screw head and the threaded portion and has an external diameter that is smaller than the external diameter of the threaded portion, a washer incorporating a passage opening the diameter of which is smaller than the external diameter of the threaded portion, and a sleeve, the internal diameter of which is greater than the external diameter of the threaded portion.

The further object of the present invention is to provide a method of producing such a combination which can be carried out in a simple manner but which nevertheless leads to the sleeve and the washer being held securely together and held securely on the screw member.

In accordance with the invention, this object is achieved by a method which comprises the following method steps:
- providing a washer pre-form incorporating a passage opening in the pre-form and at least one recess;
- providing a sleeve with at least one projection:
- arranging the sleeve on the washer pre-form in such a manner that the at least one projection of the sleeve engages in the at least one recess in the washer pre-form;
- inserting the screw member into the washer pre-form and the sleeve in such a manner that the pre-form passage opening in the washer pre-form comes to rest around the shank portion;
- pressing the sleeve against the washer pre-form in such a manner that the washer pre-form is deformed into a washer the passage opening of which has a diameter which is smaller than the external diameter of the threaded portion of the screw member, and that the sleeve and the washer are connected together and held captive on the screw member.

Further features and advantages of the invention form the subject matter of the following description and the graphical illustration of an exemplary embodiment.

BRIEF DESCRIPTION OF THE DRAWINGS

Similar or functionally equivalent elements are designated by the same reference symbols in each of the Figures.

DETAILED DESCRIPTION OF THE INVENTION

Figure 1:
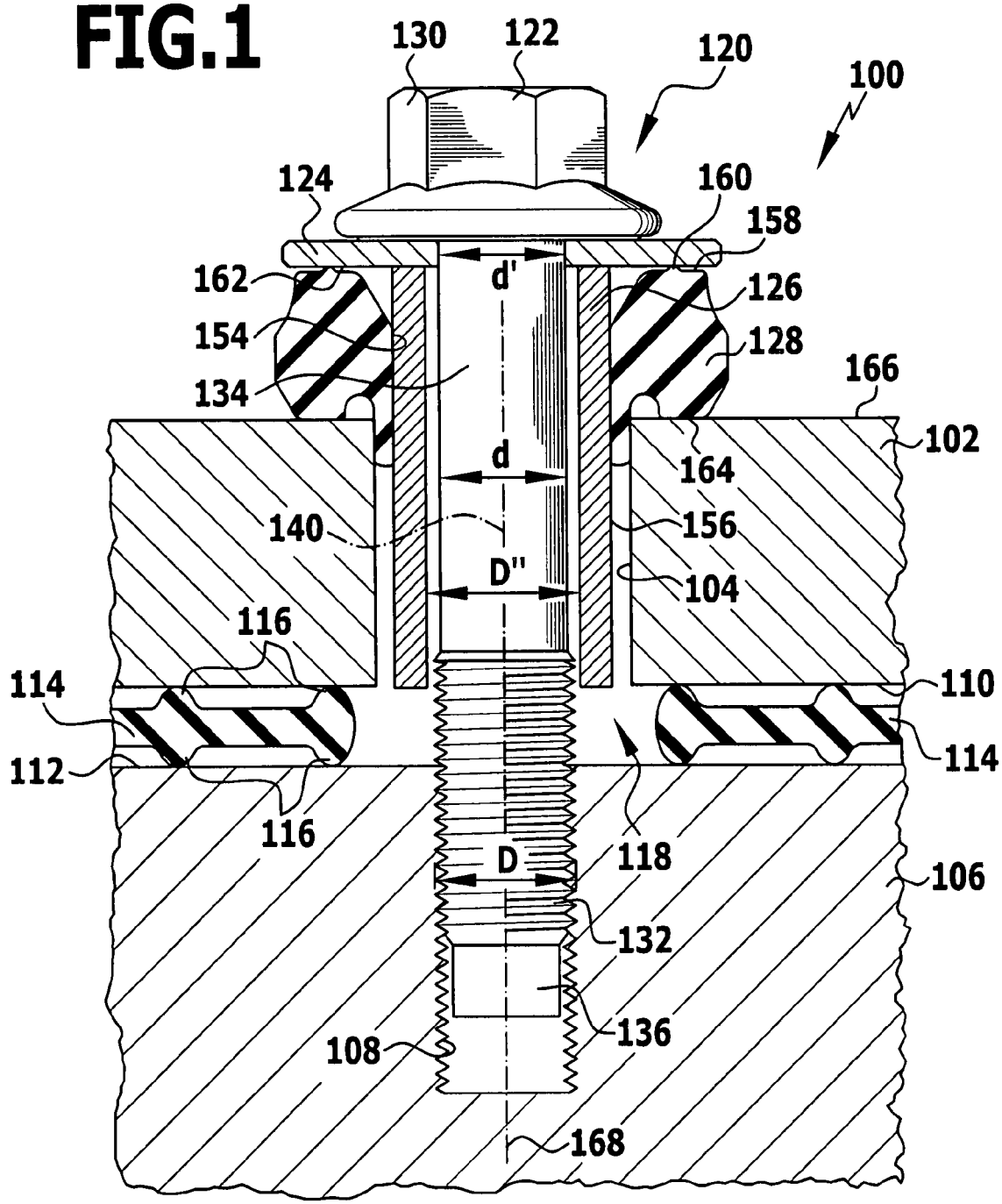
FIG. 1 shows a schematic sectional view through an assembly consisting of a first component and a second component which are fixed together by means of a screw member having a washer and a sleeve that are held captive on the screw member and are also decoupled from vibration by means of elastomer elements.

An assembly having the general reference 100 which is illustrated in sectional manner in FIG. 1 comprises a first component 102 having a substantially cylindrical passage opening 104, a second component 106 having a threaded blind hole 108, an elastomer sealing element 114 comprising sealing lips 116 that is arranged between a lower surface 110 of the first component 102 and an upper surface 112 of the second component 106 and has a passage opening 118 in the vicinity of the threaded blind hole 108, and also a combination 120 consisting of a screw member 122, a washer 124 held captive on the screw member 122, a hollow cylindrical sleeve 126 held captive on the screw member 122 and a ring-shaped element 128 surrounding the screw head end portion of the sleeve 126 in ring-like manner.

The screw member 122 comprises a screw head 130 which may be in the form of a hexagonal screw head for example, a threaded portion 132 having an external diameter D, a shank portion 134 which is arranged between the threaded portion 132 and the screw head 130 and has an external diameter d that is smaller than the external diameter D of the threaded portion, and an end portion 136 which adjoins the end of the threaded portion 132 remote from the screw head 130 and the external diameter of which is smaller than the external diameter D of the threaded portion 132 and is smaller than the external diameter d of the shank portion 134 of the screw member 122.

Figure 4:
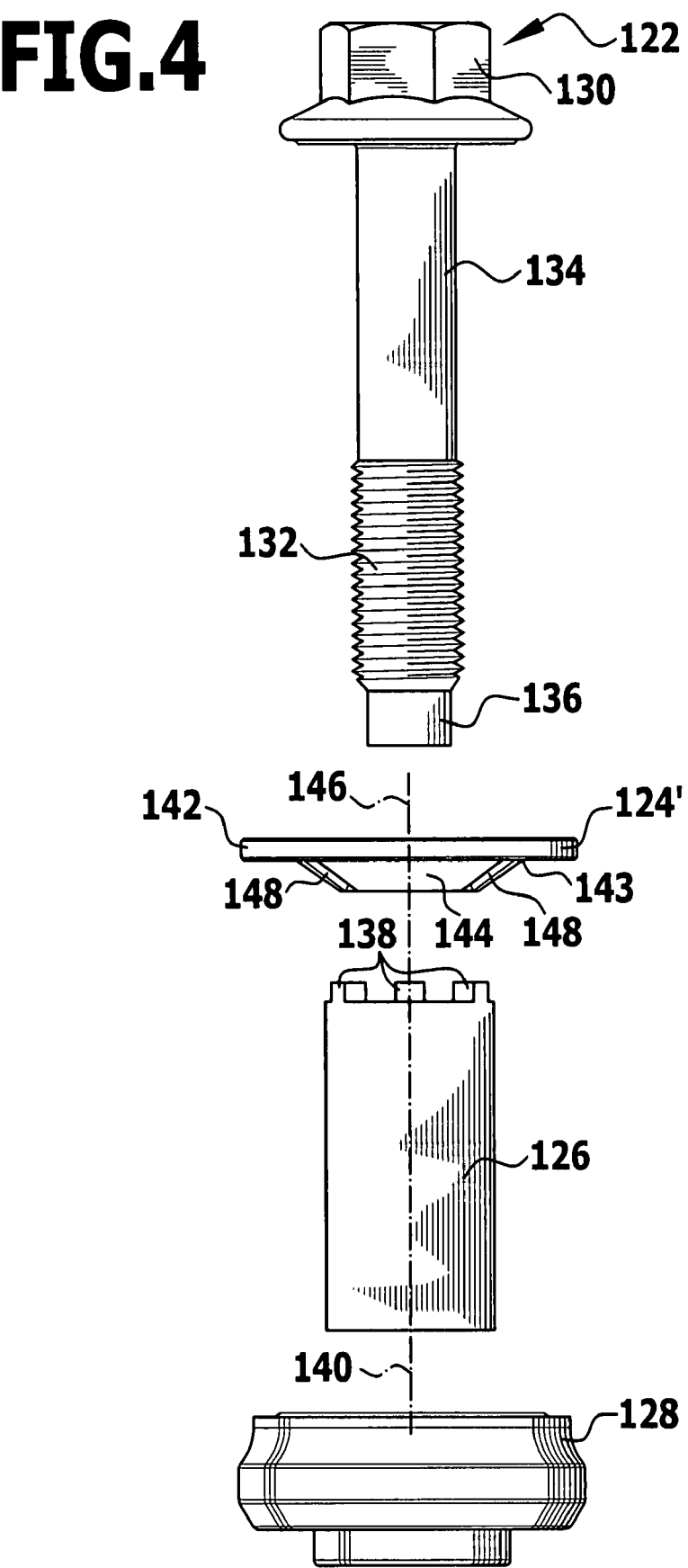
FIG. 4 a schematic exploded illustration of the screw member, a washer pre-form, the sleeve and the elastomer element prior to the assembly of these elements.

As can best be seen from FIG. 4, the sleeve 126 is of hollow cylindrical shape and it is provided at the screw head end thereof with a plurality of, three for example, projections 138 which extend parallel to the longitudinal axis 140 of the sleeve 126 and are spaced substantially equidistantly from one another around the periphery of the sleeve 126.

Figure 5:
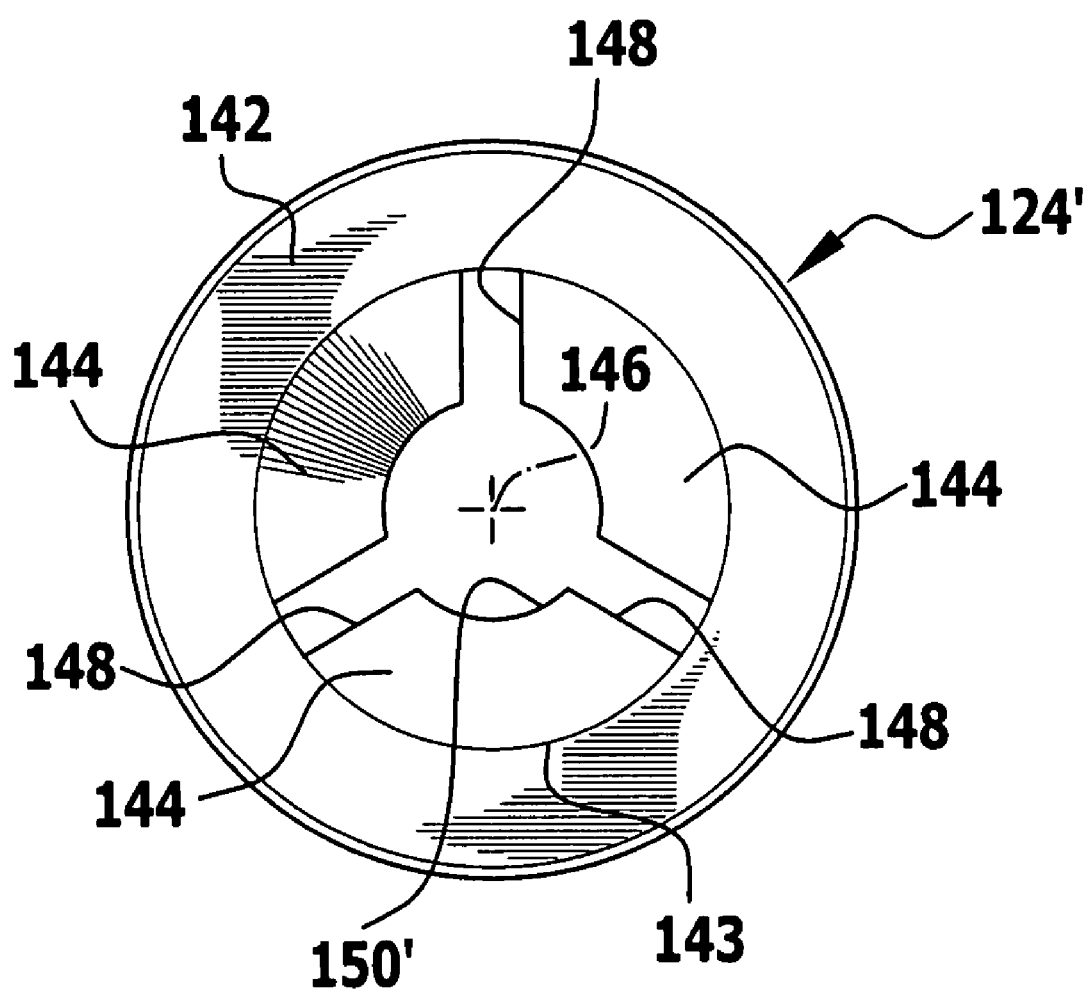
FIG. 5 a schematic plan view from above of the washer pre-form depicted in FIG. 4.

The washer 124 is formed from a washer pre-form 124' which is illustrated in FIGS. 4 and 5.

The washer pre-form 124' comprises a flat ring-like region 142 from the radially inward edge 143 of which there project a plurality of, three for example, webs 144 which are directed radially inwardly and are inclined with respect to the central axis 146 of the washer pre-form 124', preferably at an angle of approximately 30° to approximately 60° to the central axis 146. These webs 144 each extend over a substantially mutually equal peripheral angle, whereby the successive webs 144 are separated from one another around the periphery of the washer pre-form 124' by a respective recess 148 running in the radial direction.

Each of the, three for example, recesses 148 opens into a substantially circular, central passage opening 150' in the washer pre-form 124'.

In order to produce the washer 124 from the washer pre-form 124' and at the same time ensure that the washer 124 and the sleeve 126 are securely captive on the screw member 122, one proceeds as follows:

The sleeve 126 is arranged on the washer pre-form 124' in such a way that the longitudinal axis 140 of the sleeve 126 and the central axis 146 of the washer pre-form 124' coincide and the projections 138 at the screw head end of the sleeve 126 engage in a respective recess 148 of the washer pre-form 124'.

In order to make this possible, the extent of the projections 138 in the peripheral direction of the sleeve 126 is slightly smaller than the extent of the recesses 148 in the peripheral direction of the washer pre-form 124'.

Figure 6:
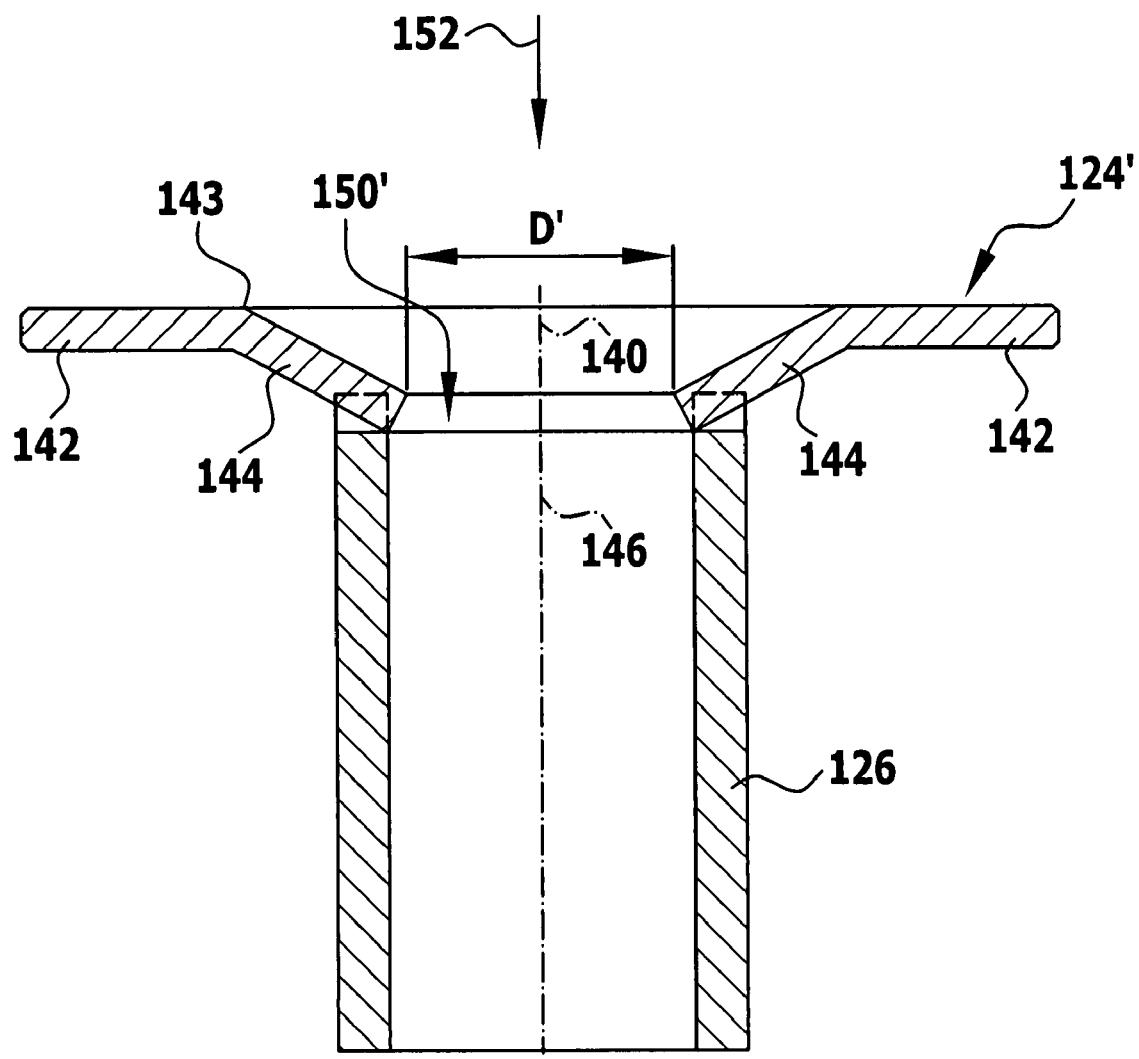
FIG. 6 a schematic longitudinal sectional view through the washer pre-form when joined to the sleeve.

As a result of joining up the sleeve 126 and the washer pre-form 124', there results an arrangement of a washer pre-form 124' and a sleeve 126 such as is illustrated in the longitudinal sectional view of FIG. 6, wherein the central passage opening 150' of the washer pre-form 124' has a diameter D' which is greater than the external diameter D of the threaded portion 132 of the screw member 122.

Consequently, the threaded portion 132 of the screw member 122 can be inserted forwardly in the direction of the arrow 152 in FIG. 6 into the washer pre-form 124' and the sleeve 126 connected thereto, namely, in such a manner that the passage opening 150' in the washer pre-form 124' comes to rest around the shank portion 134 of the screw member 122.

Figure 7:
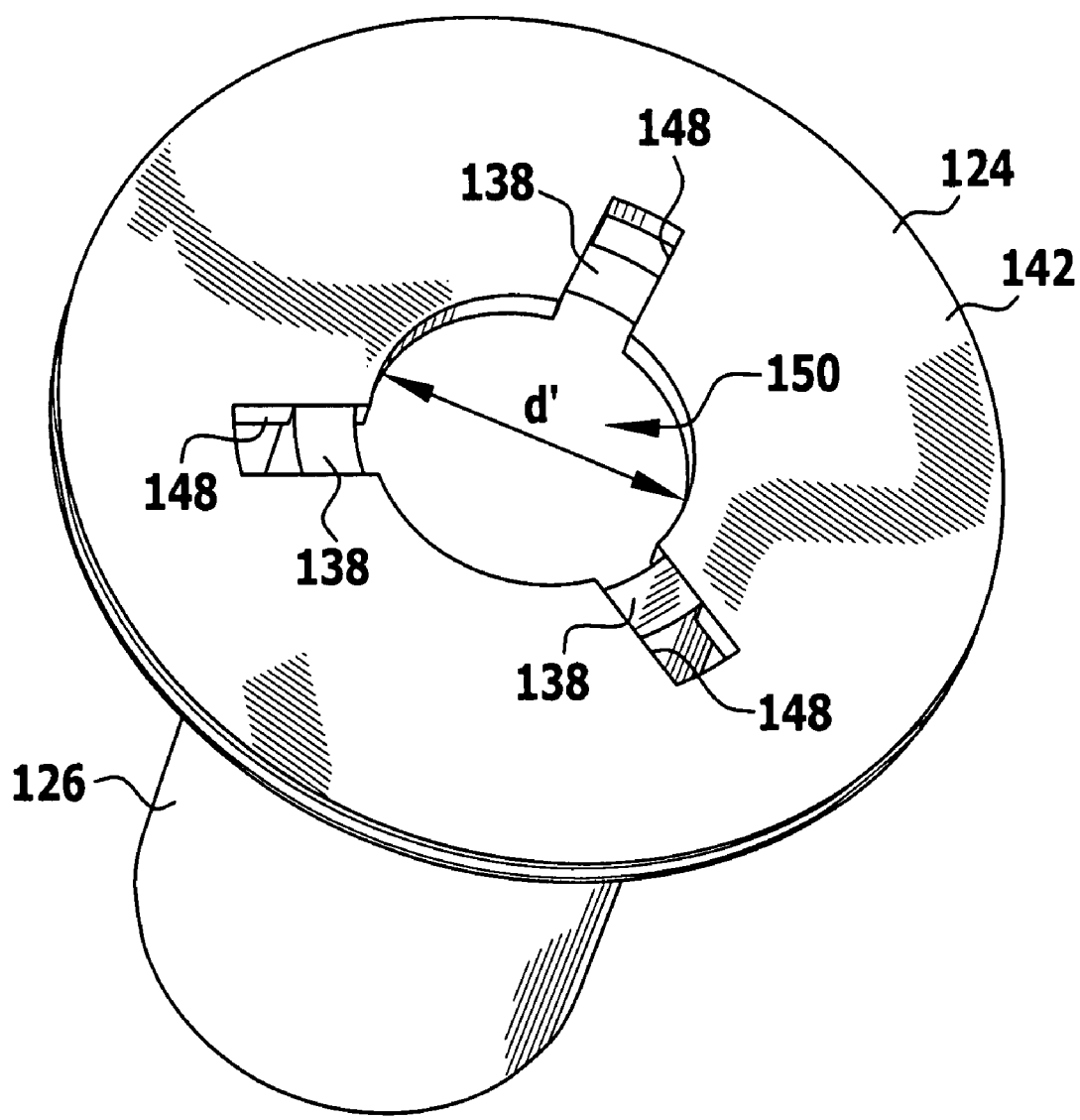
FIG. 7 a schematic perspective illustration of the washer and the sleeve after the washer and the sleeve have been pressed together.

Subsequently, the sleeve 126 and the washer pre-form 124' are pressed together in such a manner that the webs 144 are bent up into the plane of the flat ring-like region 142 of the washer pre-form 124' and there then ensues the washer 124 (see FIG. 7) which is substantially flat and incorporates a passage opening 150 having a diameter d' that is slightly greater than the external diameter d of the shank portion 134 of the screw member 122 and is smaller than the external diameter D of the threaded portion 132 of the screw member 122 so that in the region of the passage opening 150 in the washer 124 there is formed a narrow section through which the threaded portion 132 of the screw member 122 can no longer be moved.

Thus, after the action of pressing the sleeve 126 onto the washer 124 by virtue of which the sleeve 126 and the washer 124 are connected to one another in positive and/or force-locking manner, the unit consisting of the sleeve 126 and the washer 124 is held captive on the screw member 122.

Figure 2:
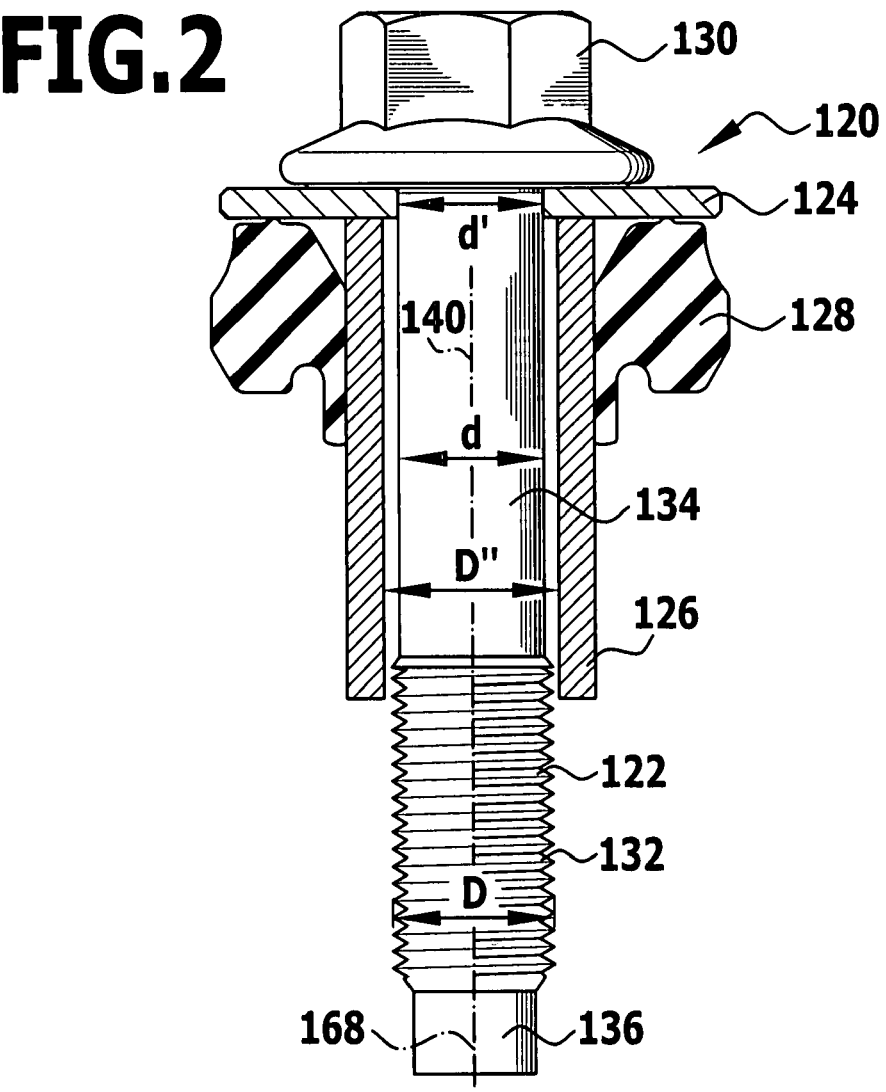
FIG. 2 a schematic longitudinal sectional view through the screw member comprising a washer, a sleeve and an elastomer element depicted in FIG. 1.
Figure 3:
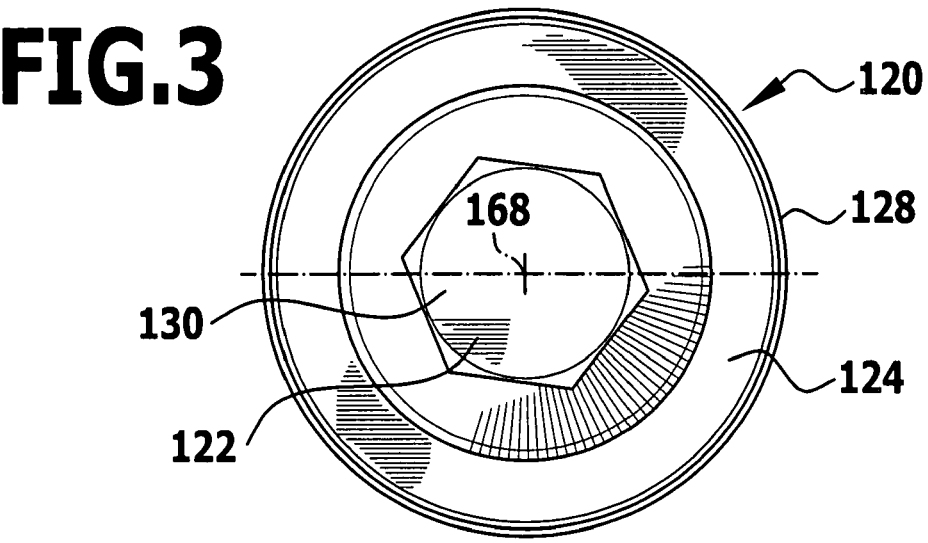
FIG. 3 a plan view from above of the screw member comprising a washer, a sleeve and an elastomer element depicted in FIG. 2.

Thereafter, the ring-shaped element 128 which is preferably formed from a resilient material, from an elastomer material for example, is pushed onto the outer surface of the sleeve 126 (see FIGS. 2 and 3).

The sleeve 126, the washer 124 and the screw member 122 are preferably formed from a metallic material, and in particular from a steel material.

As can best be seen from FIG. 1, the ring-shaped element 128 has an internal contact surface 154 for application to the outer surface 156 of the sleeve 126, a screw-head-end contact surface 158 with a sealing lip 160 for application to the lower surface 162 of the washer 124, and a component contact surface 164 that is remote from the screw head 130 for application to an upper surface 166 of the first component 102.

The ring-shaped element 128 may be pushed onto the outer surface 156 of the sleeve 126 in the form of a tight fit or it could also be a loose fit thereon.

In the installed state of the assembly 100 as is illustrated in FIG. 1, the external thread of the threaded portion 132 of the screw member 122 is rotated into the internal thread of the threaded blind hole 108 in the second component 106. The screw member 122 and the sleeve 126 extend through the passage opening 104 to the first component 102.

The sleeve 126 and the washer 124 are supported via the resilient ring-shaped element 128 on the first component 102 so that the sleeve 126, the washer 124 and the screw member 122 are vibrationally-decoupled from the first component 102.

Furthermore, due to the elastomer sealing element 114 arranged between the first component 102 and the second component 106, there is provided a vibration decoupling means between the two components 102 and 106.

In the assembled state wherein the upper surface of the washer 124 rests against the screw head 130, the sleeve 126 extends downwardly into the region of the threaded portion 132 the external diameter D of which is only slightly smaller than the internal diameter D" of the sleeve 126 so that it is ensured that the longitudinal axis 140 of the sleeve 126 is aligned substantially parallel to the longitudinal axis 168 of the screw member 122.

The invention claimed is:

1. A combination of a screw member comprising a screw head, a threaded portion and a shank portion which is arranged between the screw head and the threaded portion and has an external diameter that is smaller than the external diameter of the threaded portion, comprising a washer comprising a pressed washer pre-form having in an un-pressed state a passage opening the diameter of which is greater than the external diameter of the threaded portion, and a sleeve, the internal diameter of which is greater than the external diameter of the threaded portion, wherein the sleeve has at least one projection which engages in a recess provided in the washer, wherein the sleeve is adapted to be pressed against the washer to define a pressed state including a reduced-diameter passage opening of the washer the diameter of which reduced-diameter passage opening is smaller than the external diameter of the threaded portion in such a manner that the sleeve and the washer are connected together and held captive on the screw member.

2. A combination in accordance with claim 1, wherein the sleeve has at least two projections which engage in a respective recess provided in the washer.

3. A combination in accordance with claim 2, wherein the sleeve has at least three projections which engage in a respective recess provided in the washer.

4. A combination in accordance with claim 2, wherein the projections succeed one another with substantially equal spacings around the periphery of the sleeve.

5. A combination in accordance with claim 1, wherein the at least one projection is aligned substantially parallel to the longitudinal axis of the sleeve.

6. A combination in accordance with claim 1, wherein the at least one projection is arranged at a screw head end of the sleeve.

7. A combination in accordance with claim 1, wherein the regions of the washer bounding the at least one recess are oriented substantially perpendicularly to the longitudinal axis of the sleeve when in the state where it is pressed against the sleeve.

8. A combination in accordance with claim 1, wherein the at least one recess in the washer opens into the passage opening in the washer.

9. A combination in accordance with claim 1, wherein the passage opening in the washer is arranged substantially centrally of the washer.

10. A combination in accordance with claim 9, wherein the washer is formed from the washer pre-form in which in the unpressed state the regions of the washer bounding the at least one recess in the washer are oriented at an angle with respect to the central axis of the washer.

11. A combination in accordance with claim 10, wherein the regions of the washer pre-form bounding the at least one recess in the washer define the passage opening in the pre-form the diameter of which is greater than the diameter of the passage opening in the washer when in the state where it is pressed against the sleeve.

12. A combination in accordance with claim 11, wherein the threaded portion of the screw member is movable through the passage opening in the pre-form.

* * * * *

UNITED STATES PATENT AND TRADEMARK OFFICE
CERTIFICATE OF CORRECTION

PATENT NO. : 7,686,554 B2  Page 1 of 1
APPLICATION NO. : 11/973512
DATED : March 30, 2010
INVENTOR(S) : Erich Amann et al.

It is certified that error appears in the above-identified patent and that said Letters Patent is hereby corrected as shown below:

Title Page
Replace [73] Assignee: with --ElringKlinger AG--

Signed and Sealed this

Third Day of August, 2010

David J. Kappos
*Director of the United States Patent and Trademark Office*